United States Patent

Hoffman

[15] 3,643,805
[45] Feb. 22, 1972

[54] A MEMBRANE SYSTEM WHICH INCLUDES A TUBE SHEET FOR SECURING SUPPORTED MEMBRANE TUBES THEREIN

[72] Inventor: Robert R. Hoffman, Clark, N.J.
[73] Assignee: Abcor Water Management Company, Inc., Cambridge, Mass.
[22] Filed: Jan. 20, 1970
[21] Appl. No.: 4,256

[52] U.S. Cl..............................210/321, 210/433, 210/490, 264/261, 264/277
[51] Int. Cl. ...................................B01d 31/00, B01d 13/00
[58] Field of Search......................210/22, 23, 321, 323, 336, 210/433, 490, 500, 489; 264/261, 277

[56] References Cited

UNITED STATES PATENTS 3,485,374  12/1969  Manjikian et al. ..................210/323 X
3,480,147  11/1969  Kahyok.................................210/321

Primary Examiner—Frank A. Spear, Jr.
Attorney—Richard P. Crowley and Richard L. Stevens

[57] ABSTRACT

This disclosure is concerned with a tube sheet for holding a bundle of braided fiber support tubes in place for use in a reverse osmosis or an ultrafiltration system. The tube sheet is formed of a thermosetting plastic having a process temperature below the temperature at which the support tube will melt, degrade or deform. The thermosetting plastic is molded to the braided fiber tubes under pressure to provide a seal between the support tube and tube sheet when subjected to pressures in excess of 1,000 p.s.i. In order to prevent displacement of the braided fiber tubes from the plastic tube sheet during the molding process molded retaining members are provided which are molded to the tubes and tube sheet.

11 Claims, 4 Drawing Figures

INVENTOR.
Robert R. Hoffman
BY Sheldon H Parker
ATTORNEY

MEMBRANE SYSTEM WHICH INCLUDES A TUBE SHEET FOR SECURING SUPPORTED MEMBRANE TUBES THEREIN

BACKGROUND OF THE INVENTION

1. Field of the Invention

The present invention relates to an improved tube sheet for holding a bundle of braided support tubes in a module for use in a reverse osmosis or ultrafiltration system and more specifically to a method of molding a tube sheet made of a thermosetting material under pressure to braided support tubes by using molded retaining members to provide a seal between the support tubes and tube sheet when operated at pressures in excess of 1,000 p.s.i.

2. Description of the Prior Art

It is well known that when solutions of different concentrations are separated by an ideal semipermeable or osmotic membrane, the pure solvent will pass from the dilute solution through the membrane into the concentrated solution until an equilibrium point is reached. At this point, the difference in solution pressure on opposite sides of the membrane is the osmotic pressure difference of the two solutions. If a pressure greater than this pressure is applied to the concentrated solution, then the pure solvent will pass through the membrane to the dilute solution and this is known as reverse osmosis.

Reverse osmosis has particular application for use in the desalination of sea and brackish waters and other separation processes where recovery of a solvent or a more concentrated solution is desired. The solvent recovery flow rate and the general efficiency of reverse osmosis processes are improved when they are operated at pressures in the order of about 1,000 to about 1,500 p.s.i. Since the semipermeable membrane used is thin and incapable by itself of withstanding the reverse osmosis pressure to which it is subjected during the process mechanical supports must be used. One such support which can readily withstand the high operating pressures, is described in the copending U.S. Pat. application Ser. No. 770,979, filed on Oct. 28, 1968 (now U.S. Pat. 3,547,272 issued Dec. 15, 1970). This support member is described as a braided support tube made from glass fibers, and impregnated with cement in order to hold the braided configuration.

While the braided tube is an excellent support member it has been found that when it is assembled onto a conventional tube sheet the solution to be treated in the process will leak at the point where the tube and tube sheet are joined. To overcome this problem various types of apparatus and methods were suggested for connecting the braided tube to the tube sheet.

One such method is the use of a resin which is applied to the top section of the braided tube, the treated tube is then placed within an opening in the support tube and the resin allowed to dry and set to form a seal. However, when the process was operated at pressures in excess of 1,000 p.s.i. the resin seal ruptured causing a leak between the tube and tube sheet which contaminated the yield material.

Another method suggested was to wedge the tube within the opening in the tube sheet by means of O-rings plugs, etc. However, these components are expensive and some of these components must be machined to size. Also some of the components would rupture the semipermeable membrane, which is mounted within the tube, at the point of seal between the tube and tube support.

SUMMARY OF THE INVENTION

This invention concerns a membrane system, particularly a reverse osmosis system, which includes a tube sheet for securing support tubes containing membranes and to a method of forming and securing the tube sheets to support tubes containing membranes.

The present invention provides a tube sheet, which avoids the drawbacks mentioned above and provides new and valuable advantages in the operation of reverse osmosis processes. One of the most important advantages is the face that the tube sheet of the invention will form a seal with the braided tube which can readily withstand reverse osmosis working pressures of 1,000 p.s.i. and often as high as 4,200 p.s.i. with virtually no tendency for the seal to crack, rupture or otherwise fail in structural integrity. Since the solvent recovery rate is correlated, in part, directly to the magnitude of the reverse osmosis working pressure, the superior tube sheet of the invention which provides a high-pressure seal between the braided tube and the tube sheet permits more rapid and efficient separations.

Another advantage is the fact that the tube sheet is molded directly onto the braided tubes to form a unitary member. This in turn allows the unitary member which is made up of a number of braided tubes and two tube sheets to be connected to a header plate to form a complete header system and there is no need to manufacture an expensive and separate tube sheet.

Still another important advantage of the invention is that because the tube sheet is molded directly onto the braided tubes there is no problem with dimensions of openings in the tube sheet to insure a proper fit for the braided tubes when inserted into the openings. Thus, the tube sheet of the invention eliminates a very costly step of machining within very close tolerances which is an inherent disadvantage in existing tube sheets.

The foregoing advantages are achieved in accordance with the invention by using a thermosetting material which is molded to the braided tubes under pressure to form a high-pressure seal between the braided tubes and tube sheet. In order to prevent the braided tubes from being displaced from the thermosetting plastic during the molding process it is important that molded retaining members are formed at the exposed ends of the tubes and the top of the tube sheet during the molding process. After the tube sheet is removed from the mold the flash is removed from the tube sheet and the tube sheet is then ready to be connected to a header plate to form a complete header system for immediate use without any additional manufacturing steps.

There is no criticality in the choice of thermosetting plastics which can be used in the invention except that they must have a process temperature below the temperature at which the support tube will melt, degrade or deform. In this connection it has been found that phenol-formaldehydes, cast phenolic resins, urea plastics, melamine formaldehyde plastics, alkyd resins, allyl resins, acrylonitrile-butudiene-styrene, epoxies, methyl methacrylites, epoxy resins, polyamides, polybenzimidazoles, polybenzothiazoles, caseins, polyesters, glass-filled epoxy materials and silicones are materials which can be used for the tube sheet. Of course other thermosetting plastics can be used as will be apparent to those skilled in the art.

The tube sheet is formed by setting the braided fiber support tubes in a mold and then by means of transfer molding or compression molding the thermosetting plastic is pressed into the mold so that the ends of the tubes are covered with the plastic. The pressure under which the plastic is subjected to is from about 100 p.s.i. to about 1,000 p.s.i. Of course, as is usual in transfer of compression welding, the thermosetting plastic is first heated to plasticize the thermoset plastic before transferring the plastic to the mold. However, the temperature at which the plastic enters the mold is not critical provided it is below temperature at which the support tube will melt, degrade or deform.

Because of the high molding pressures necessary to obtain a water tight seal between the tube sheet and the support tubes a great deal of difficulty is experienced in holding the support tubes in place during the molding process. It has been found that if the mold is provided with small circular cavities the thermosetting plastic will form molded retaining members affixed to the support tubes and tube sheet which completely eliminates the aforesaid problem. While it is not completely understood as to why the molded retaining member prevents the support tubes from being forced out of the mold during the molding process it is believed that because of the small volume of the molded retaining member it will set quickly and thus hold the support tubes in place while the tube sheet is being formed. Although no proof has been found which will support or deny the above theory, it is clear that unless molded retaining means are provided the unexpected results achieved with the present invention cannot be obtained.

Further details of the invention will be readily understood by reference to the accompanying drawings which illustrate a preferred embodiment thereof and of which:

Figure 1:
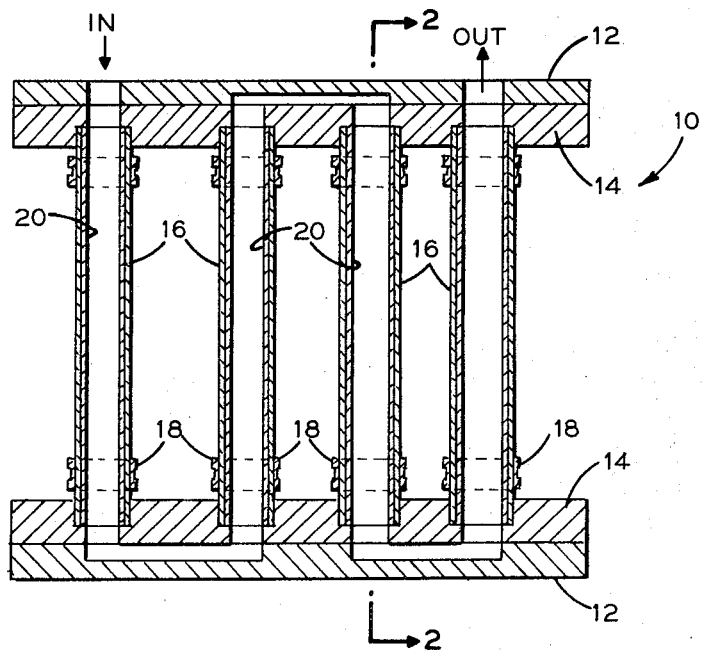
FIG. 1 is a cross-sectional view of the header system of the invention.
Figure 2:
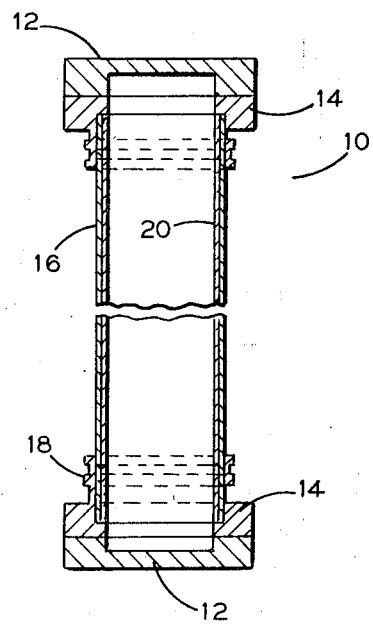
FIG. 2 is a section taken along line 2—2 of FIG. 1.

Referring to FIGS. 1 and 2 a reverse osmosis system 10 is shown comprising header plates 12, tube sheets 14, braided support tubes 16, molded retaining means 18 and osmotic membranes 20.

Figure 3:
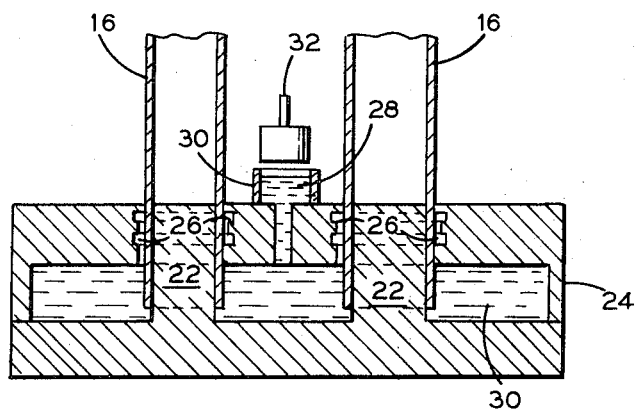
FIG. 3 is a simplified apparatus for molding the braided support tubes to the tube sheet of FIG. 1.

In constructing the system 10 the braided support tubes 16, which can be made of glass fibers reinforced with an epoxy, is placed over protuberances 22 in a suitable mold 24 (see FIG. 3). The mold 24 which is shown with only two protuberances 22 for two tubes 16 for simplicity, in actual practice can contain up to 14 or more tubes. The mold 24 also has circular channels 26 the importance of which will be explained below.

A thermoset plastic 28 is placed in a nozzle 30 and heated to an appropriate temperature. A ram 32 then transfers the heated thermoset plastic at a pressure of about 100 p.s.i. to about 1,000 p.s.i. to the mold filling a cavity 30 which will form the tube sheet 14, and the circular channels 26. The channels 26 will form the molded retaining means which insures that the support tubes 16 will not be displaced during the molding process.

Figure 4:
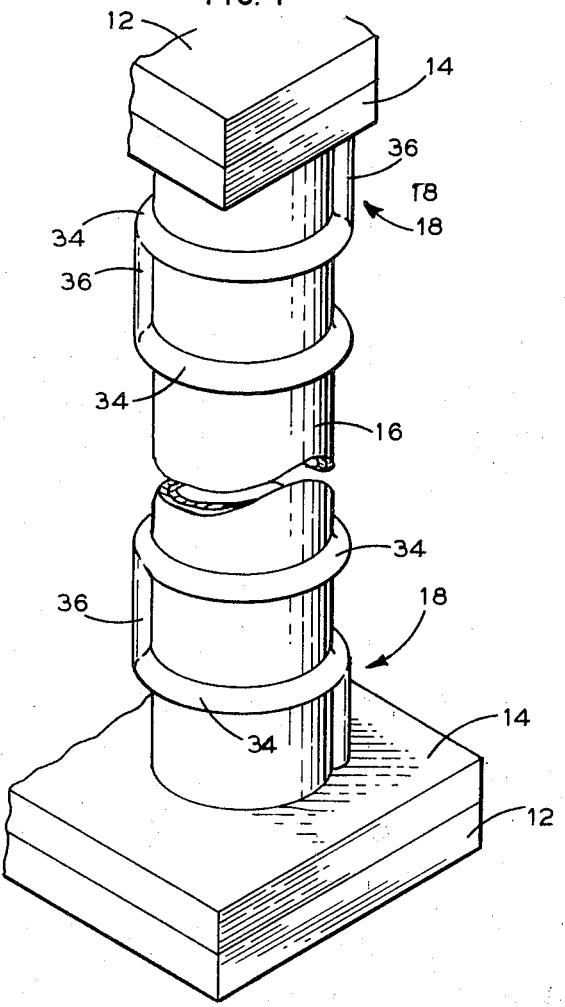
FIG. 4 is a perspective view of the header system of FIG. 1 with only one braided support tube shown for purposes of illustration.

While the molded retaining means 18 are shown to be two annular rings 34 connected to each other and the tube sheets 14 lay straight members 36 (see FIG. 4) other shapes such as a set of finger members will work just as well.

The thermoset plastic is then allowed to harden and the process repeated for the other end of the braided support tubes 16. One osmotic membrane 20 is then placed in each support tube 16, now molded in the tube sheet 14 and a header plate 12 attached to the tube sheet to complete the process.

The header plate 12 which can be made of metal or plastic is fastened to the support tube by means well known to the art. The header plate 12 will also determine whether the system will operate in series as shown in FIG. 1 or in parallel (not shown). As can be seen from FIG. 1 the liquid entering the system will be required to pass through each tube before allowing to exit. However, the header plate could just as well be constructed with ports corresponding to each support tube thus allowing the liquid to make a single pass through the system as is well known in the art.

Further details of the invention will be illustrated in the following examples which are intended to be illustrative only and not limitations of the invention.

EXAMPLE I 400 g. of epoxy (Allied Chemical 1904 epoxy) is heated to 320° F. in a transfer molding apparatus. The epoxy is then transferred at a pressure of 1,000 p.s.i. into a mold similar to that shown in FIG. 3 holding 4 braided support tubes and the epoxy is allowed to harden. The process is repeated for the other end of the support tubes. A header plate arranged for parallel flow of liquid is attached to each end of the tube sheet by means of bolts.

EXAMPLE II

The method of Example I is repeated using phenol formaldehyde heated to a temperature of 350° F. in place of the epoxy and an excellent watertight system is obtained.

EXAMPLE III 780 g. of epoxy is heated to approximately 320° F. in a compression molding apparatus. The epoxy is then transferred at a pressure of 1,000 p.s.i. into a mold holding 8 braided support tubes. The mold is similar to that shown in FIG. 3 except in place of the circular channels 6 vertical channels are used. After the epoxy is in the mold it is allowed to harden and the process repeated for the other end of the braided support tubes. A header plate is then attached to each end of the tube sheet to form a complete system. The system is tested under a pressure of 1,500 p.s.i. and found to be completely watertight.

It will be understood that it is intended to cover all changes and modifications of the preferred embodiments of the invention, herein chosen for the purpose of illustration, which do not constitute departures from the spirit and scope of the invention.

I claim:

1. A method of forming a tube sheet for an osmotic system comprising the steps of:
   i. seating a plurality of braided support tubes in a mold characterized by a cavity in the form of a tube sheet and channels in the form of a mold-retaining means, the open ends of the tubes seated on and sealed by protuberances within the mold cavity;
   ii. heating a thermosetting plastic to a temperature which will not deform, degrade or melt said support tubes;
   iii. transferring said heated thermosetting plastic at pressure of about 100 p.s.i. to about 1,000 p.s.i. into said mold cavity and channels; and
   iv. allowing said thermosetting plastic to harden to form a tube sheet and molded-retaining means molded to the exterior surface of the support tubes as a unitary member.

2. The method of claim 1 which includes the step of fastening a header plate to said tube sheet.

3. The method of claim 1 wherein said channels will form a molded retaining means having the shape of two annular rings connected by a straight member.

4. The method of claim 1 wherein the thermosetting plastic is selected from the group consisting of phenolformaldehydes, cast phenolic resins, urea plastics, melamine formaldehyde plastics, alkyd resins, allyl resins, acryloni-trile-butudiene-styrene, epoxies, methyl methacrylites, epoxy resins, polyamides, polybenzimidazoles, polybenzothiazoles, caseins, polyesters, glass-filled epoxy materials and silicones.

5. An apparatus for the separation of a solution by a semipermeable membrane, which apparatus comprises: a plurality of support tubes; a semipermeable membrane adjacent the interior walls of each of said support tubes; means to secure the support tubes at their ends, the means including conduits for connecting the ends of tubes one to another; means to introduce a solution to be separated; and means to withdraw the solution after separation, the improvement which comprises:
   a tube sheet comprising a molded, hardened thermoset plastic, which plastic is characterized by a mold-processing temperature below the temperature at which the support tubes will deform, degrade or melt, the tube sheet molded and secured to the exterior surface of the ends of the support tubes, and including a retaining means of the hardened thermoset plastic molded onto the exterior surface of and near the ends of said support tubes, but not embedded within the tube sheet, the mold-retaining means adapted to prevent the displacement of the support tubes from the mold during the forming of the tube sheet.

6. The apparatus of claim 5 wherein the retaining means comprises a series of molded annular rings about the support tubes.

7. The apparatus of claim 5 wherein the retaining means comprises a plurality of annular rings connected to each other and to the tube sheet by means of connecting members.

8. The apparatus of claim 5 wherein the support tubes comprise a braided glass fiber support tube reinforced with a resin.

9. The apparatus of claim 5 wherein the thermosetting plastic comprising the tube sheet is selected from the group consisting of phenol-formaldehyde plastics, alkyl resins, allyl resins, acrylonitrile-butadiene-styrene, epoxys, methyl mechacrylites, epoxy resins, polyamides, polybenzimidazoles, polybenzothiazoles, caseins, polyesters, glass-filled epoxy material and silicones.

10. The apparatus of claim 5 wherein the retaining means comprises a molded retaining means of two annular rings connected to each other and to the tube sheet by means of straight members.

11. The apparatus of claim 5, which apparatus includes a header plate secured to the tube sheet.

* * * * *